(12) United States Patent
Mireshghi

(10) Patent No.: US 9,200,465 B2
(45) Date of Patent: Dec. 1, 2015

(54) METHOD AND APPARATUS FOR SOLAR POOL HEATING

(76) Inventor: Ali Mireshghi, Saratoga, CA (US)

( * ) Notice: Subject to any disclaimer, the term of this patent is extended or adjusted under 35 U.S.C. 154(b) by 588 days.

(21) Appl. No.: 13/571,346

(22) Filed: Aug. 10, 2012

(65) Prior Publication Data

US 2014/0041651 A1 Feb. 13, 2014

(51) Int. Cl.
*F24J 2/04* (2006.01)
*E04H 4/12* (2006.01)
*F24J 2/42* (2006.01)

(52) U.S. Cl.
CPC ............... *E04H 4/129* (2013.01); *F24J 2/0472* (2013.01); *F24J 2/423* (2013.01)

(58) Field of Classification Search
USPC ......................................... 126/561, 565, 714
See application file for complete search history.

(56) References Cited

U.S. PATENT DOCUMENTS

| | | | | |
|---|---|---|---|---|
| 4,038,970 A * | 8/1977 | D'Ascoli et al. | ............... | 126/584 |
| 4,305,117 A * | 12/1981 | Evans | ............... | 362/96 |
| 4,513,768 A * | 4/1985 | Sarver et al. | ............... | 137/142 |
| 4,686,960 A * | 8/1987 | Kleinwachter | ............... | 126/585 |
| 4,920,465 A * | 4/1990 | Sargent | ............... | 362/96 |
| 5,143,052 A * | 9/1992 | Case | ............... | 126/565 |
| 6,119,957 A * | 9/2000 | Liu | ............... | 239/17 |
| 6,179,218 B1 * | 1/2001 | Gates | ............... | 239/17 |
| 6,375,090 B1 * | 4/2002 | Beidokhti | ............... | 239/17 |
| 6,755,349 B2 * | 6/2004 | Beidokhti | ............... | 239/17 |
| 7,316,359 B2 * | 1/2008 | Beidokhti | ............... | 239/18 |
| 7,427,036 B2 * | 9/2008 | Skluzacek et al. | ............... | 239/18 |
| 7,793,652 B1 * | 9/2010 | Delgado | ............... | 126/565 |
| 8,613,396 B1 * | 12/2013 | Anderson | ............... | 236/93 A |
| 2002/0179728 A1 * | 12/2002 | Beidokhti | ............... | 239/20 |
| 2003/0188737 A1 * | 10/2003 | Swanljung | ............... | 126/565 |
| 2005/0133088 A1 * | 6/2005 | Bologeorges | ............... | 136/291 |
| 2006/0243819 A1 * | 11/2006 | Beidokhti | ............... | 239/18 |
| 2010/0282240 A1 * | 11/2010 | Hare | ............... | 126/565 |
| 2012/0024372 A1 * | 2/2012 | Delgado | ............... | 136/259 |
| 2012/0255706 A1 * | 10/2012 | Tadayon et al. | ............... | 165/47 |

FOREIGN PATENT DOCUMENTS

DE 20204569 U1 * 8/2003

OTHER PUBLICATIONS

Prahl, DE 20204569 U1, Aug. 7, 2003, English machine translation.*

* cited by examiner

*Primary Examiner* — Jorge Pereiro

(57) ABSTRACT

An apparatus for solar heating of a pool may comprise a floating member, a water heater chamber (WHC) attached to the floating member, and one or more first tubes penetrating into the WHC to allow water from the pool enter the WHC. The floating member may be operable to make the WHC floatable. The apparatus may also include one or more exit ports to allow heated water from the floatable WHC to enter the pool. The floatable WHC may utilize incident solar energy to heat up water. Water may continue to flow into the floatable WHC from the pool due to convection current.

17 Claims, 7 Drawing Sheets

US 9,200,465 B2

METHOD AND APPARATUS FOR SOLAR POOL HEATING

FIELD

The subject technology relates in general to solar heating, and more particularly to solar pool heating.

BACKGROUND

Many solar pool heaters use one or more solar collectors (e.g., solar panels) installed on a nearby roof or rack to collect solar energy and heat up the pool water which is fed to the collector via one or more feed lines. The return lines from the solar collectors may return the heated water back to the pool. The pool water may be pumped to the solar panels via electric pumps. Although the current solar pool heating systems may serve their own purpose, they are faced with a number of disadvantages and shortcomings. For many pool owners, for example, the total cost of the system (e.g., the cost of solar panels and other materials and installation fee) may a prohibitive factor. Some pool owners may not be happy with the aesthetic aspects such as the change in the look of their roofs and buildings due to installation of solar collectors and the associated feed and return-line tubes. Others may find the noise of the pumps bothersome.

An important shortcoming of the current solar pool heating systems, however, may be the low efficiency of the system that may arise from heat losses, for example, in the return line that in some cases may be quite long, and the energy consumption of the one or more pumps in the feed lines of the solar collectors. There is a need for a low cost modular high efficiency solar pool heater that can alleviate most of the disadvantages of the existing solar pool heating systems.

SUMMARY

In an aspect of the disclosure, an apparatus for solar heating of a pool may comprise a floating member, a water heater chamber (WHC) attached to the floating member, and one or more first tubes penetrating into the WHC from a bottom surface of the WHC to allow water from the pool enter the WHC. The floating member may be operable to make the WHC floatable. The apparatus may also include one or more exit ports to allow heated water from the floatable WHC to enter the pool. The floatable WHC may utilize incident solar energy to heat up water. Water may continue to flow into the floatable WHC from the pool due to convection current.

In another aspect of the disclosure, a method may be provided for solar heating of a pool. The method may comprise facilitating receiving solar energy into a WHC. Floatation of the WHC may be facilitated by using a floating member attached to the WHC. The floating member may be operable to make the WHC floatable. Flowing of pool water to the floatable WHC may be facilitated through one or more first tubes penetrating into the floatable WHC (e.g., from a bottom surface of the floatable WHC). Flow of heated water from a top portion of floatable WHC to the pool may be facilitated through one or more exit ports.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1A:
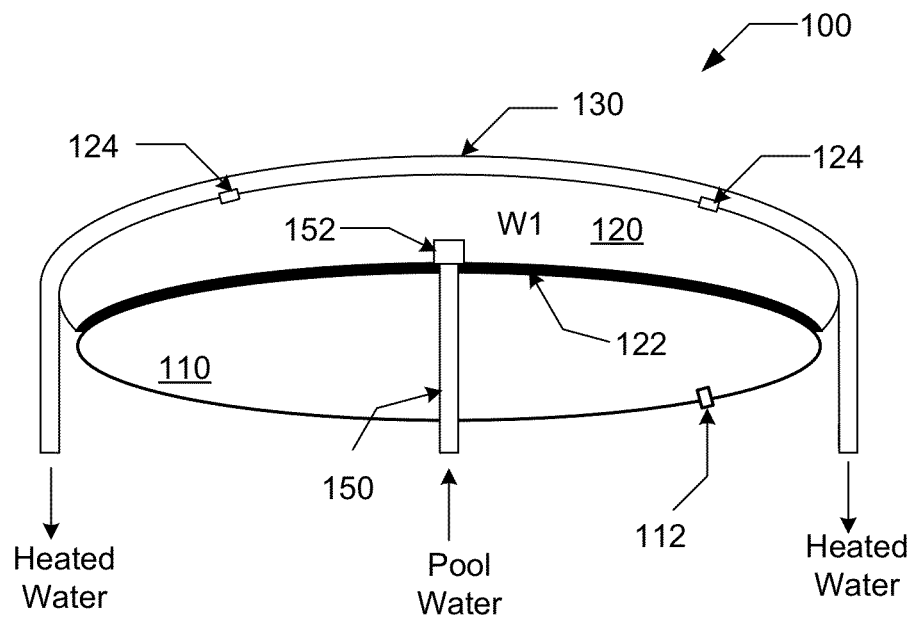
FIG. 1A is a diagram illustrating an example of a solar pool heater, in accordance with certain configurations of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known circuit elements and components are shown in block diagram form in order to avoid obscuring the concepts of the subject technology. Like components are labeled with identical element numbers for ease of understanding.

Broadly and generally, in one aspect, the present disclosure provides apparatus for solar heating of a pool. The apparatus may comprise a floating member, a water heater chamber (WHC) attached to the floating member, and one or more first tubes penetrating into the WHC from a bottom surface of the WHC to allow water from the pool enter the WHC. The floating member may be operable to make the WHC floatable. The apparatus may also include one or more exit ports to allow heated water from the floatable WHC to enter the pool (e.g., a swimming pool such as a pool that the solar pool heater is floating on (herein after "the pool")). The floatable WHC may utilize incident solar energy to heat up water. Water may continue to flow into the floatable WHC from the pool due to convection current Broadly and generally, in one aspect, a method may be provided for solar heating of a pool. The method may comprise facilitating receiving solar energy into a water heater chamber (WHC). Floatation of the WHC may be facilitated by using a floating member attached to the WHC. The floating member may be operable to make the WHC floatable. Flowing of pool water to the floatable WHC may be facilitated through one or more first tubes penetrating into the floatable WHC (e.g., from a bottom surface of the floatable WHC). Flow of heated water from a top portion of floatable WHC to the pool may be facilitated through one or more exit ports.

Existing solar pool heater systems may collect solar energy through solar collectors that are installed on one or more racks or roofs adjacent to a pool. Generally, such pool heater systems may also include one or more pumps for pumping the pool water to the collectors. The efficiency of the existing system is negatively affected by at least two factors, namely, the power consumption of the pumps and the heat loss of the relatively long return line which may result in lowering the temperature of the water delivered from the solar collectors to the pool. The traditional solar pool heater systems are also costly and not readily installable by non-professionals.

The solar pool heaters disclosed in the present disclosure may provide a number of advantages over the traditional solar pool heaters, examples of which are listed in the following. A) The disclosed solar pool heater absorbs a large portion of the incident solar energy; B) The disclosed solar pool heater does not need a pump for transporting water from the pool to the heater, and in embodiments that the disclosed solar pool heater uses a pump, the pump may be powered by one or more solar panels, rather than by the power line; C) The disclosed solar pool heater may be put to use by placing it on the pool surface after the floating member is inflated and may not require installation, per se. D) The disclosed solar pool heater may cost much less than the existing solar pool heating system, even when a number of the disclosed solar pool heaters are used for heating a pool. E) The disclosed solar pool heater may provide the heated water to the pool through one or more water fountain nuzzles attached to one or more exit ports of the water heater chamber (WHC), thereby adding to the beauty of the pool.

FIG. 1A is a diagram illustrating an example of a solar pool heater 100, in accordance with certain configurations of the present disclosure. Solar pool heater 100 basically comprises an inflatable floating member 110 and a WHC 120. The inflatable member 110, when inflated, may be of various shapes, for example, an oval shape, a donut shape, or other shapes. The inflatable member 110 may be inflated, by a pump or otherwise, to a suitable level that can hold the WHC 120 floating on the pool surface while it contains water, for example when the WHC 120 is full. Designing floatable objects, in terms of volume and weight is well known. For instance, the solar pool heater 100 may float over a pool if a ratio of the mass of the solar pool heater 100, including the proper amount of pool water in the WHC 120, to the volume of the solar pool heater 100 is less than the density of the water of the pool (e.g., about 1 gr/cm$^3$).

The inflatable member 110 may be inflated through an input port 112, which may be positioned in a suitable place on the inflatable member 110, for example, on the bottom or a side of the inflatable member 110. The input port 112 may include one or more suitable nuzzles for coupling to a pump for pumping air or another suitable gas into the inflatable member 110. In some aspects, the nozzle may be suitable for inflating the inflatable member 110 by a user through mouth. The floating member 110 may be attached to the WHC 120. In an aspect, the floating member 110 may be attached (e.g., adhered or otherwise made permanently connected) to the WHC 120, such that the inflatable member 110 and the WHC 120 may be permanently joined together. In some aspects, the floating member 110 may be attached to the WHC 120 through one or more attachments (e.g., knobs, buttons, or other kind of attachments) at one or more points of contact. The inflatable member may be made of any light and water-resistance flexible material (e.g., fabrics, plastics, vinyl such as poly vinyl chloride (PVC), etc.). The WHC 120 may also be referred to a floatable WHC as it is made floatable by being attached to the floating member.

In one aspect, the WHC 120 may be filled with water (e.g., pool water) through one or more first tubes 150, which may penetrate the WHC 120 through a bottom surface of the WHC 120. In an aspect, the one or more first tubes 150 (also referred to as "inlet tubes") may pass through the inflatable member 110. In aspects, where the inflatable member 110 is donut shaped, the one or more first tubes 150 may directly penetrate the WHC 120. The one or more first tubes may be made of any suitable material (e.g., plastic, PVC, etc.), which is suitable for coupling (e.g., adhering or joining) to the WHC 120. In operation, the user may push the solar pool heater 100, when the inflation member is already inflated, onto the surface of the pool so that pool water (e.g., cold water) can flow through the one or more first tubes 150 to the WHC 120, from the pool, to fill the WHC 120 to a suitable level (e.g., nearly full). Each of the one or more first tubes 150 may include a unidirectional valve 152 that prevents water from escaping the floatable WHC through the first tube. In some embodiments, the unidirectional valve 152 may be configured inside each of the one or more first tubes 150 and may or may not be visible from outside. In an aspect, the unidirectional valve 152 may comprise a simple flapper valve or other unidirectional gateways that only allow water to enter the WHC 120 from the pool and not vice versa.

In an aspect, the WHC 120 may be made of a light and water-resistance flexible material (e.g., fabrics, plastics, vinyl such as poly vinyl chloride (PVC), etc.). The WHC 120 may facilitate collecting solar energy, when receiving sun light, and heating the water inside the WHC 120. As the water temperature rises due to capturing solar heat, the water may expand and naturally exit through one or more exit ports 124. One or more exit ports may be coupled to one or more second tubes 130, which may transport the heated water to the pool. The one or more second tubes 130 may be made of a suitable material (e.g., plastic, PVC, etc.) and may be coupled to the one or more exit ports 124, permanently or via detachable couplers. The one or more second tubes 130 may be made with a suitable length, for example, they may be made to reach the pool surface or penetrate the pool water and deliver the warm water to the pool at some depth of the pool. The second tubes 130 may help to conserve the heat absorbed in the water and prevent loss of the heat to the ambient environment.

An exit port 124 may include a value, such as temperature sensitive valve, which may open at a predetermined temperature or temperature range (e.g., about a desired pool water temperature, for example, in a range of 80-90 degrees Fahrenheit or other desired temperatures or temperature ranges). In some aspects, the valve may be sensitive to temperature change or to pressure or pressure change. In an aspect, the one or more exit ports 124 may be coupled to one or more water fountain nuzzles to pour the warm water to the pool in a number of fountain patterns.

An upper portion of the WHC 120 may be made, for example, at least partially of vinyl and may be substantially transparent to sun light to allow solar energy enter the floatable WHC 120. A bottom portion 122 of the WHC 120 may be substantially sun-light absorbent to facilitate absorption of the solar energy entering the WHC 120. In an aspect, the bottom portion 122 of the WHC 120 may be made of or coated with a sun-light absorbent material (e.g., made of plastics or other material containing pure or alloy forms of carbon, tungsten, amorphous silicon, silicon carbide, cesium, or other dopants or trace elements or painted with black paint, or coated with material containing pure or alloy forms of carbon, tungsten, amorphous silicon, silicon carbide, cesium, or other dopants or trace elements). In an aspect, the sun-light absorbent material may include detonation nano-diamond (DND), which can convert ionizing radiation received by the solar pool heater to visible light that can be in turn absorbed by the other components of the sun-light absorbent material and converted to heat, thereby further increasing efficiency radiation-to-heat conversion efficiency of the solar water heater.

Figure 1B:
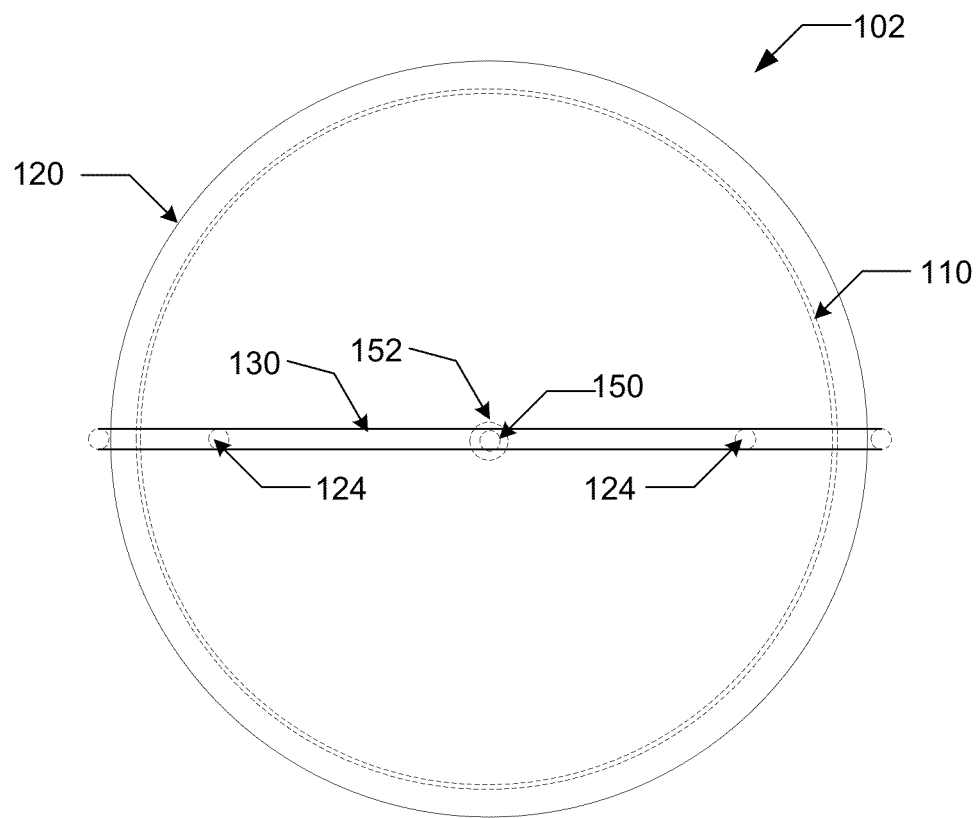
FIG. 1B is a diagram illustrating an example of a top view of the solar pool heater of FIG. 1A, in accordance with certain configurations of the present disclosure.

FIG. 1B is a diagram illustrating an example of a top view 102 of the solar pool heater 100 of FIG. 1A, in accordance with certain configurations of the present disclosure. In the top view 102, the coupling of the second tube 130 to the WHC 120 through water exit ports 124 are shown with broken lines, as they may not be visible from the top. In the top view 102, the boundaries of the floating member 110 are also shown by broken lines, because the floating member 110 may not be visible when viewing from the top of the solar pool heater 100. However, the relative size and position of the floating member 110 and the WHC 120 may be different from shown in FIGS. 1A-1B and the floating member 110 and the WHC 120 may have any geometrical shape. For example, either of the floating member 110 and the WHC 120, and preferably the floating member 110 may be made in a shape to resemble or relate to, for example, an animal (e.g., a turtle, a shark, a fish, a dolphin, etc.), an object (e.g., an airplane, a helicopter, a boat, a ship, a car, etc.), or a human (e.g., a swimmer, a flying human, a human face, a human body, etc.) or any other creature.

Figure 2A:
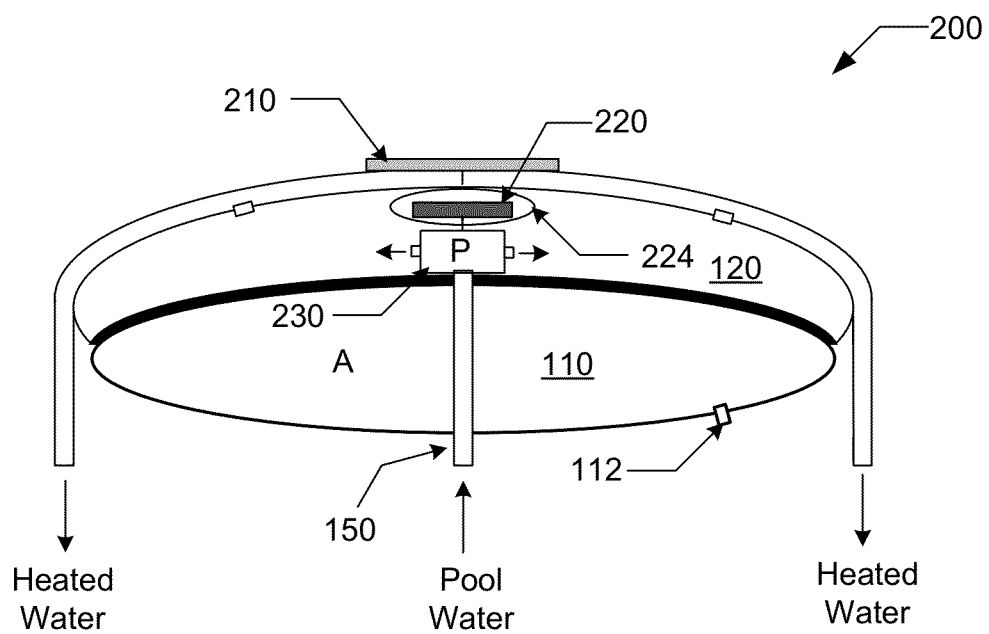
FIG. 2A is a diagram illustrating an example of a solar pool heater including a solar panel and a pump, in accordance with certain configurations of the present disclosure.

FIG. 2A is a diagram illustrating an example of a solar pool heater 200 including a solar panel 210 and a pump 230, in accordance with certain configurations of the present disclosure. The solar panel 210 is operable to provide power for the electronic module 220, which in turn can be operable to control the pump 230. In an aspect, the pump 230 when operated by the electronic module 220 may facilitate drawing of pool water from the pool into WHC 120 via the tube 150, or other means. In some aspects, the solar panel 210 may take one of many geometrical shapes (e.g., square, circle, rectangular, etc.), and may/may not have an opening, for example, in the middle. The solar panel 210 may be made of a suitable material or a suitable combination of materials, for example, a photovoltaic material (e.g., silicon, cadmium telluride, copper indium selenide/sulfide, etc.) in various forms (e.g., crystalline, amorphous, microcrystalline, etc.), and be produced on one or more substrate, which may be a flexible (e.g., PVC) or a solid (e.g., glass, silicon, etc.) substrate. In some aspects, the size and position of the solar panel 220 relative to the WHC 120 may be such that it may not substantially block a top/side surface of the WHC 120 from the incident rays of the sun. The solar panel 220 may be detachable from the solar pool heater 200.

In some aspects, the electronic module 220 may include a chargeable battery that can be charged by the solar panel 210 and the related electronic circuit/circuits for such charging. The electronic module 220 may be operable to provide power for and control the pump 230, for example, turn the pump 230 ON or OFF or control the speed or direction of rotation (e.g., forward or reverse) of the pump 230. The electronic module 220 may also be operable to communicate with a remote control, for example, to turn the pump ON or OFF or change the direction of rotation of the pump 230. The electronic module 220 including the rechargeable battery may be housed in a water proof cover (e.g. a bag) 224 or otherwise be protected from the surrounding water (e.g., suitably sealed with a water proof material). The electronic module 220 may be electrically coupled to the solar panel 210 via a sealed (e.g., water sealed) coupling in a sealed manner. The pump 230 may have a suitable size and power for filling or emptying the WHC 120 and be electrically coupled to the electronic module 220 via a sealed (e.g., water sealed) coupling in a sealed manner.

Figure 2B:
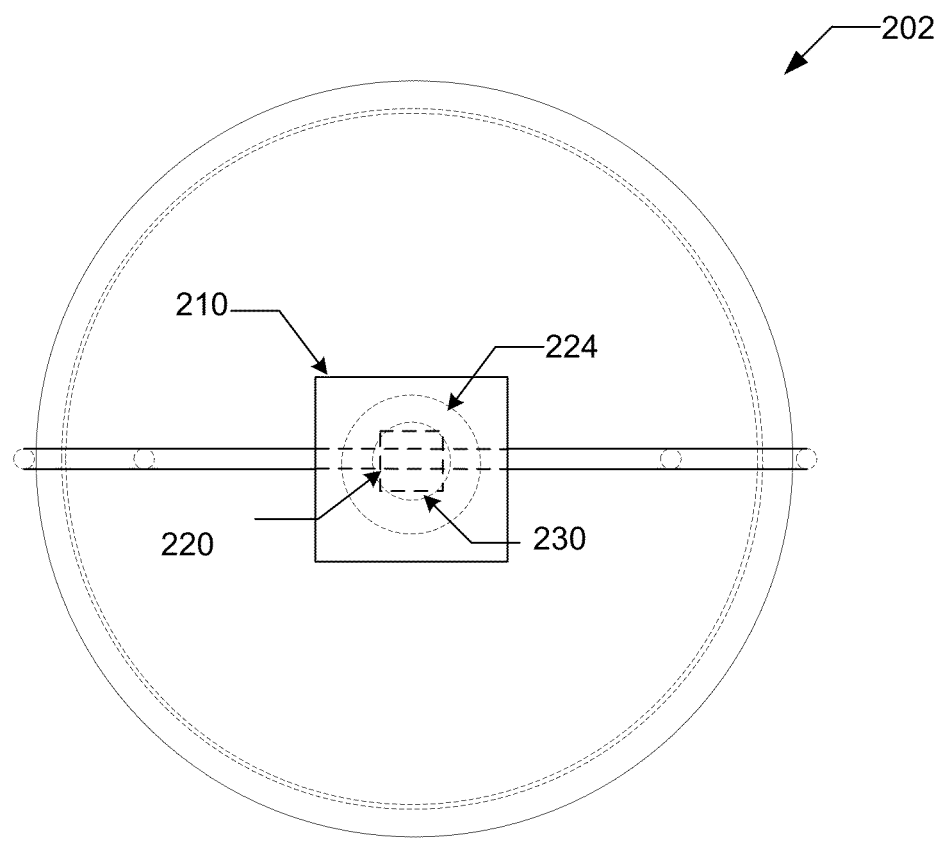
FIG. 2B is a diagram illustrating an example of a top view of the solar pool heater of FIG. 2A, in accordance with certain configurations of the present disclosure.

FIG. 2B is a diagram illustrating an example of a top view 202 of the solar pool heater 200 of FIG. 2A, in accordance with certain configurations of the present disclosure. In the top view 202, the cover 224, electronic module 220 and the pump 230 are shown with broken lines, as they may not be visible from the top. In the top view 102, the boundaries of the floating member 110 are also shown with broken lines, because the floating member 110 may not be visible when viewing from the top of the solar pool heater 200. However, as mentioned above, the relative size and position of the floating member 110 and the WHC 120 may be different from shown in FIGS. 2A-2B and the floating member 110 and the WHC 120 may have any geometrical shape, as discussed above with respect to FIG. 1B.

Figure 3A:
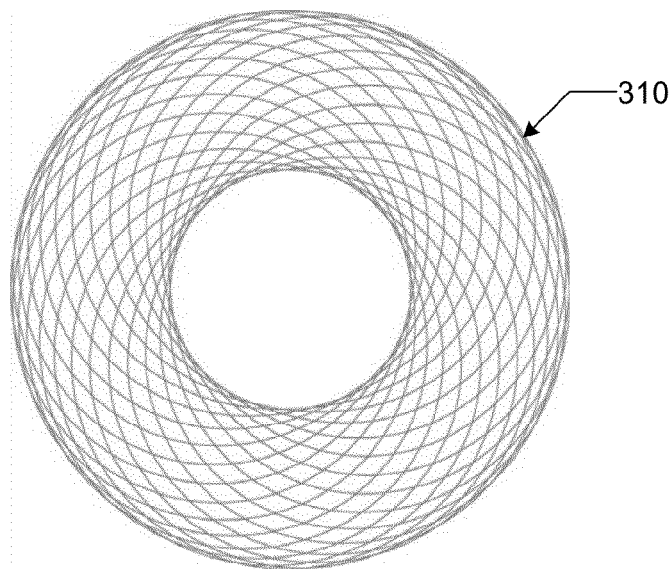
FIG. 3A is a diagram illustrating an example of a donut shaped floating member of the solar pool heater of FIG. 1A, in accordance with certain configurations of the present disclosure.

FIG. 3A is a diagram illustrating an example of a donut shaped floating member 310 of the solar pool heater 100 of FIG. 1A (or 200 of FIG. 2A), in accordance with certain configurations of the present disclosure. Although, the floating member 110 of FIG. 1 may be of different shapes, one of the more popular shapes may be donut shape (e.g., floating member 310). The floating member 310 may be attached (e.g., adhered or otherwise made permanently connected) to the WHC 320 of FIG. 3B, such that the floating member 310 and the WHC 320 may be permanently joined together. In some aspects, the floating member 310 may be attached to the WHC 320 through one or more attachments (e.g., knobs, buttons, or other kind of attachments) at one or more points of contact. The floating member 110 may be made of any light and water-resistance flexible material (e.g., fabrics, plastics, vinyl such as poly vinyl chloride (PVC), etc.).

Figure 3B:
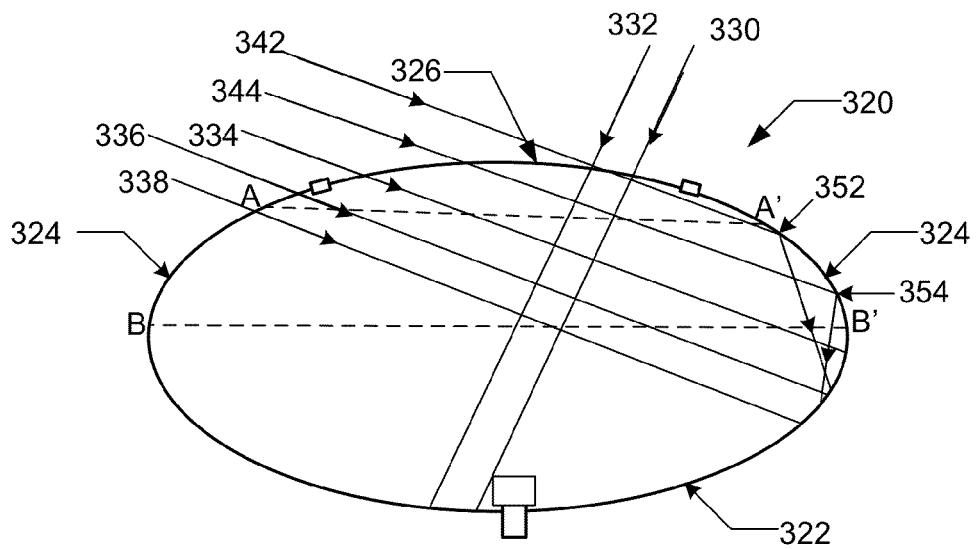
FIG. 3B is a diagram illustrating an example of a water heater chamber (WHC) of the solar pool heater of FIG. 1A, in accordance with certain configurations of the present disclosure.

FIG. 3B is a diagram illustrating an example of a WHC 320 of the solar pool heater 100 of FIG. 1A (or 200 of FIG. 2A), in accordance with certain configurations of the present disclosure. The WHC 320 may have properties, features, and functionalities described above in connection with WHC 120. However, embodiment in WHC 320 may include additional properties, features, and functionalities as described herein. It is worth mentioning here that the view shown in FIG. 3B is a side view of the WHC 320, therefore a bottom portion BB' of WHC 320 (e.g., portion shown below broken line BB') represents a curved surface (hereinafter "bottom portion 322") and side portions AB and A'B' of WHC 320 represent a closed belt (e.g. a side portion of a dish shaped surface in an upside-down position, hereinafter "side portion 324"). The top portion above the broke line AA' of WHC 320 represents a curved surface (e.g., a surface of an upside-down dish, hereinafter "top portion 326").

In some aspects, the top portion 326 may be sun light transparent (e.g., made of a transparent material such as clear plastics, clear vinyl such as clear poly vinyl chloride (PVC), etc.), such that sun rays at different angles can enter the WHC 320. The side portion 324 may be made reflective of sun light from inside such that sun rays incident on the side portion 324 can be reflected and hit the bottom portion 322, which is made sun light absorbent and can absorb the reflected light. In some aspects, the top portion 326, the side portion 324 and the bottom portion 322 may be made of the same or different materials with the same or different thicknesses. The relative size of the top portion 326, the side portion 324, and the bottom portion 322 may be selected to optimize the energy efficiency of the WHC 320. As the incident angle of the sun rays varies during various times of the day, the WHC 320 can maintain its efficiency because during the times that the sun is in the sky above the pool, the sun rays, e.g., rays 330 and 332, can directly hit the bottom portion 322 and be absorbed, and during the time that the sun rays are oblique (e.g., at an angle), some of the rays (e.g., 334, 336 and 338) may still hit the light absorbing bottom portion 322 directly and be absorbed, and some other rays (e.g., 342 and 342) may hit the reflective side portion 324 (e.g., at points 352 and 354) and be reflected to eventually hit the light absorbing portion 322, and be absorbed. In an aspect the side portion 324 may be sun light absorbent form outside. In one aspect, the side portion 324 may be sun light absorbent form both inside and outside surfaces. The side portion 324 may be sun light absorbent from the outside surface.

To make a portion of the WHC 320 sun light absorbent, the portion may be made of or coated with a sun-light absorbent material (e.g., made of plastics or other material containing pure or alloy forms of carbon, tungsten, amorphous silicon, silicon carbide, cesium, or other dopants or trace elements or painted with black paint, or coated with material containing pure or alloy forms of carbon, tungsten, amorphous silicon, silicon carbide, cesium, or other dopants or trace elements). In an aspect, the sun-light absorbent material may include detonation nano-diamond (DND), which can convert ionizing radiation received by the solar pool heater to visible light that can be in turn absorbed by the other components of the sun-light absorbent material and converted to heat, thereby further increasing efficiency radiation-to-heat conversion efficiency of the solar water heater.

Figure 3C:
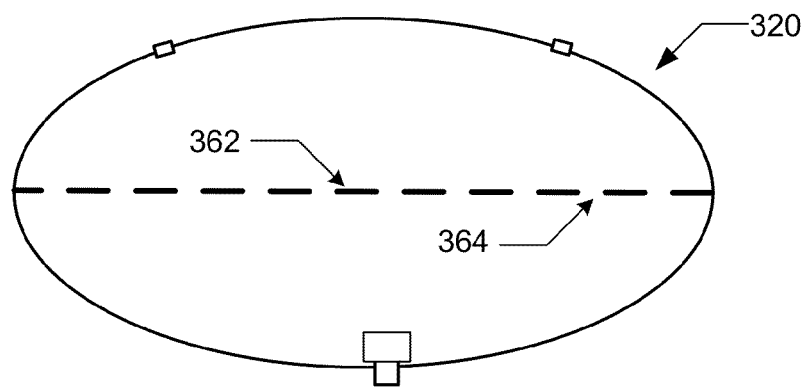
FIG. 3C is a diagram illustrating an example of a WHC including a perforated membrane, in accordance with certain configurations of the present disclosure.

FIG. 3C is a diagram illustrating an example of a WHC 320 including a perforated membrane 362, in accordance with certain configurations of the present disclosure. In an aspect, the WHC 320 may additionally include the perforated membrane 362 attached inside the WHC 320. The perforated membrane 362 may be made of or coated, on a top surface of the membrane, with a sun light absorbing material. The perforated membrane 362 may allow water transport through perforations 364 and facilitate converting solar energy to heat. In the embodiment including the perforated membrane 362, a top portion of the WHC 320 above the perforated membrane 362 may be made of transparent material and a bottom portion of the WHC 320 below the perforated membrane 362 may be made sun absorbent as described above.

Figure 4A:
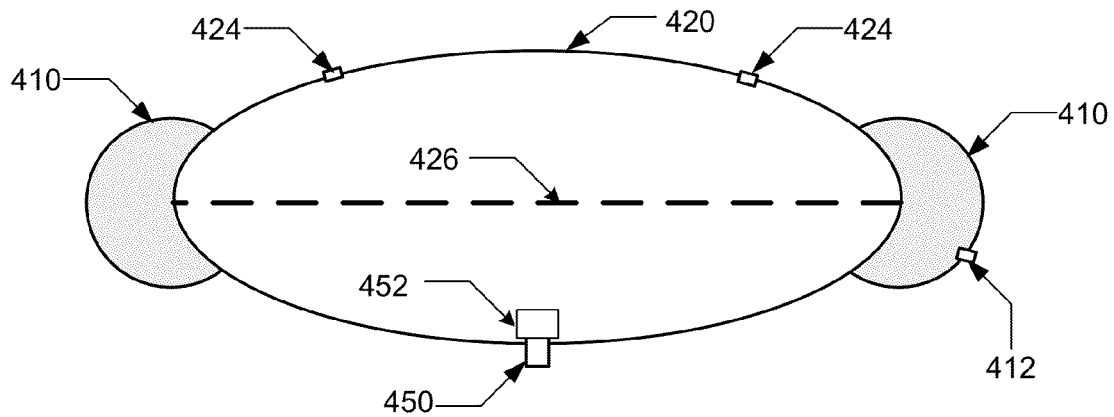
FIG. 4A-4C are diagrams illustrating examples of the WHC of FIG. 3B attached to donut shaped floating members in various configurations, in accordance with certain configurations of the present disclosure.
Figure 4B:
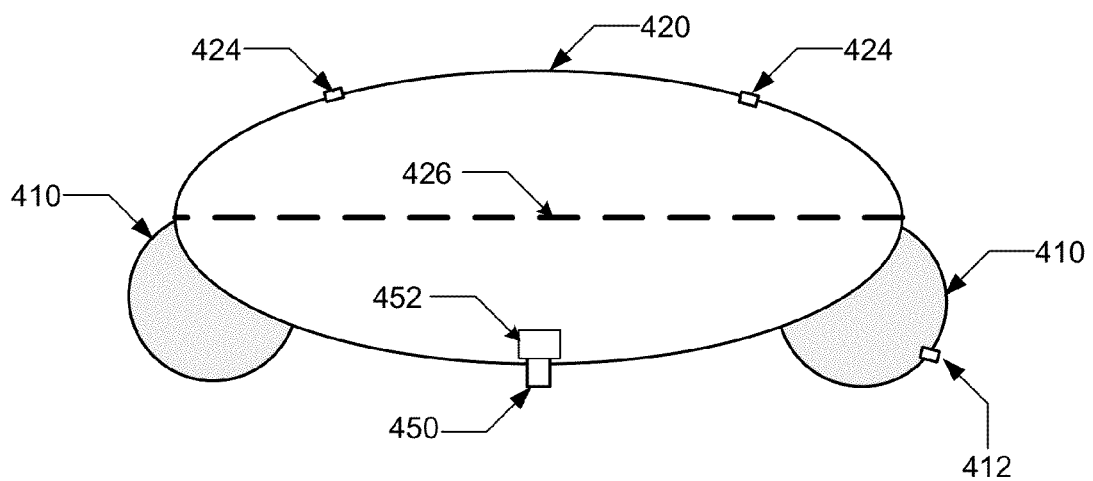
Figure 4C:
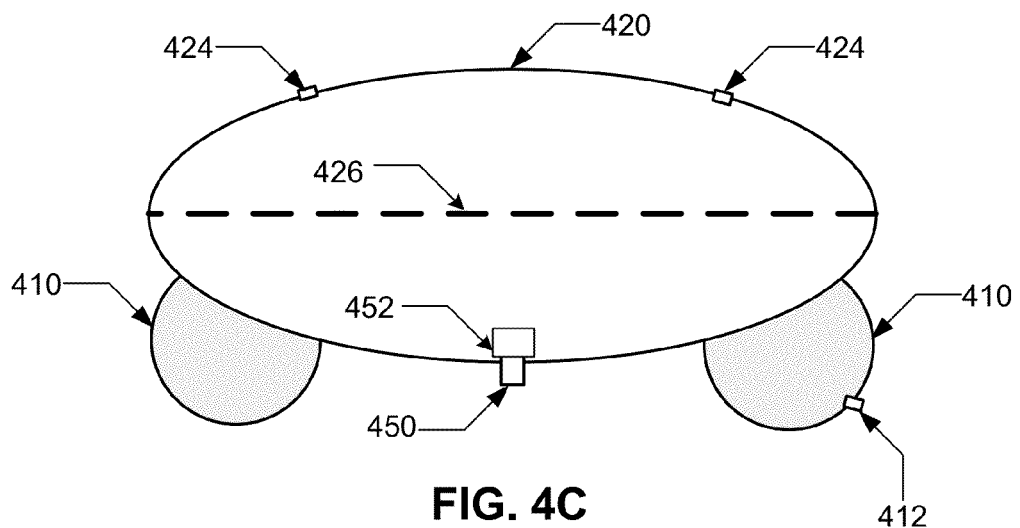

FIG. 4A-4C are diagrams illustrating examples of the WHC of FIG. 3B or 3C attached to donut shaped floating members 410 in various configurations, in accordance with certain configurations of the present disclosure. The position of the floating members 410 with respect to the WHCs 420 may vary, for example, in the aspect shown in FIG. 4A, the floating member 410 is less than a full donut in the sense that some internal portions of the donut is taken over by the WHC 420. In the aspect shown in FIG. 4B, the floating member 410 is lowered with respect to WHC 420, or in other words, its diameter is made smaller as compared to FIG. 4A. In the aspect shown in FIG. 4C, the floating member s 410 is further lowered with respect to WHC 420 (i.e., has a smaller diameter as compared to FIG. 4B).

In the aspects shown in FIGS. 4A-4C, reference numbers 424, 450, 452 and 426 represent exit ports, inlet tubes, unidirectional valves, and perforated membranes, respectively. Input ports 412 may be used to inflate the floating member 410. The Input ports 412 may be operable to be inflated by mouth or via a pump. Although in the aspects shown in FIGS. 4A-4C the floating members 410 are donut shape or close to a donut shape, in some aspects the floating members 410 may have other shapes and the relative size and position of the floating member 410 and the WHC 420 may be different from shown in FIGS. 4A-4C, and the floating member 410 and the WHC 420 may have other geometrical shapes. For example, either of the floating member 410 and the WHC 420, and preferably floating member 410 may be made in a shape to resemble or relate to, for example, an animal (e.g., a turtle, a shark, a fish, a dolphin, etc.), an object (e.g., an airplane, a helicopter, a boat, a ship, a car, etc.), or a human (e.g., a swimmer, a flying human, a human face, a human body, etc.) or any other creature. The main purpose of the floating member 410 is to keep the WHC 420 afloat, so different shapes or geometries, as long as the overall volume of the floating member 410 and the WHC 420 is suitably designed to keep the WHC 420, when substantially filled with water, floating may work.

Figure 5A:
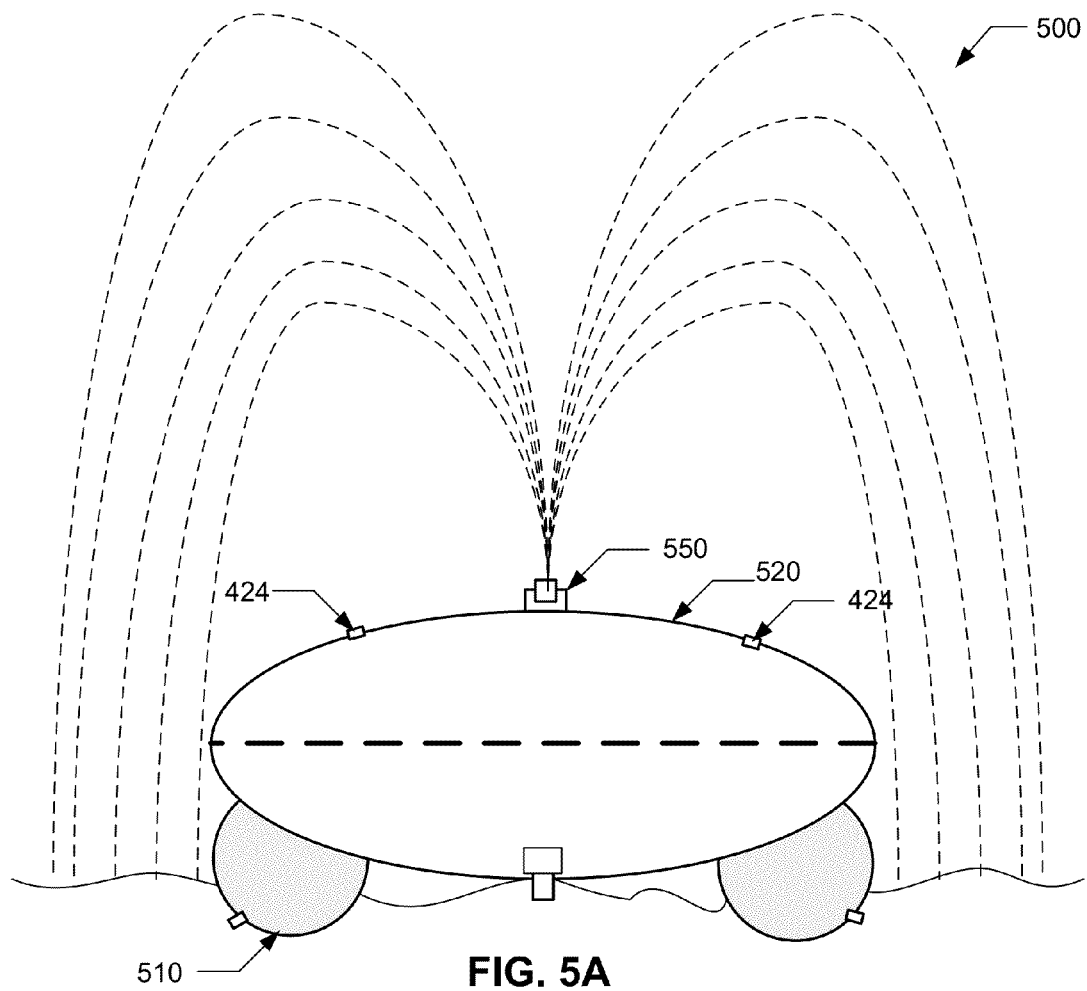
FIG. 5A-5B are diagrams illustrating examples of WHCs of a solar pool heater attached to a donut shaped floating member and having one or more water fountain nuzzles, one or more lighting source, and a solar panel in accordance with certain configurations of the present disclosure.
Figure 5B:
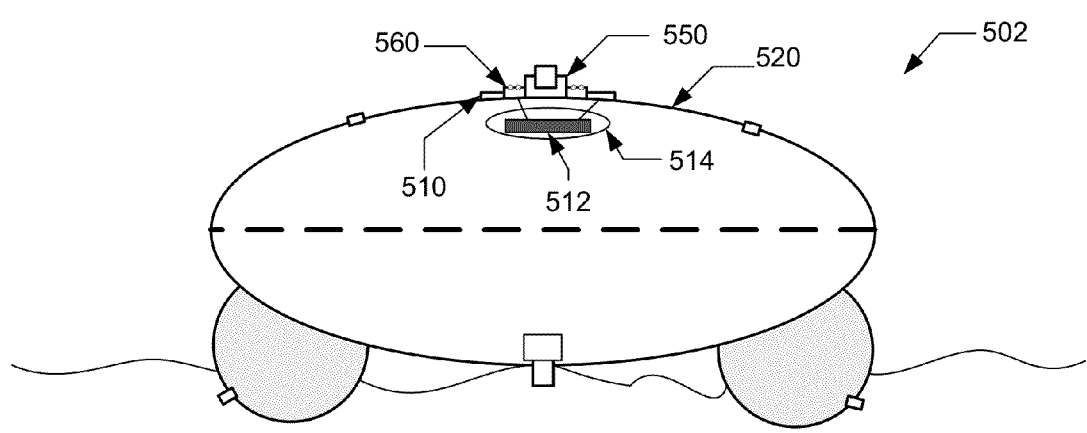

FIG. 5A-5B are diagrams illustrating examples of solar pool heaters 500 and 502 having one or more water fountain nuzzles 550, one or more lighting sources 560 and a solar panel 510 in accordance with certain configurations of the present disclosure. The water fountain nuzzle 550 may be operable, after closing the exit ports 424, by the pressure built in WHC 520 due to solar heating of the water content of the WHC 520. The water, instead of exiting from the exit ports 424, may exit through the water fountain nuzzle 550 in various patterns. The one or more patterns formed by the exit water may depend on the size, the number of, and the configurations of holes of the water fountain nuzzle 510. In an aspect, the water fountain nuzzle 550 may be detachable and only be attached when desired by a user. When the water fountain nuzzle 550 is removed, a cap may be used to close off a nuzzle port that the water fountain nuzzle 550 may be attached to (e.g., screwed in or otherwise fixed to). In an aspect, the nuzzle port may be one of the exit ports 424. In some aspects, the solar pool heater 500 may include a number of water fountain nuzzles, with the same or different patterns.

In some aspects, the solar pool heater 500 may be the same or similar to the examples shown in FIGS. 3B-3C or FIGS. 4A-4C. In other aspects, the floating member 510 of the solar pool heater 500 may have other shapes and its relative size and position with respect to WHC 520 may be different from examples shown in FIGS. 4A-4C, and the floating member 510 and the WHC 520 may have other geometrical shapes. For example, either of the floating member 510 and the WHC 520, and preferably floating member 510 may be made in a shape to resemble or relate to, for example, an animal (e.g., a turtle, a shark, a fish, a dolphin, etc.), an object (e.g., an airplane, a helicopter, a boat, a ship, a car, etc.), or a human (e.g., a swimmer, a flying human, a human face, a human body, etc.) or any other creature. The main purpose of the floating member 510 is to keep the WHC 520 afloat, so different shapes or geometries, as long as the overall volume of the floating member 510 and the WHC 520 is suitably designed to keep the WHC 520, when substantially filled with water, floating may work.

In some aspects, the solar pool heater 502 may include a solar panel 510 and lighting source 560. The solar panel 510 and the lighting source 560 may be coupled to an electronic module 512. The solar panel 510 may be operable to provide power for the electronic module 512 and lighting source 560. The electronic module 512 can be operable to control the lighting source 560 and a pump (e.g. the pump 230 of FIG. 2A, not shown in FIG. 5B for simplicity). In some aspects, the solar panel 510 may take one of many geometrical shapes (e.g., square, circle, rectangular, etc.) and may have an opening, for example, in the middle. The solar panel 510 may be made of a suitable material or a suitable combination of materials, for example, a photovoltaic material (e.g., silicon, cadmium telluride, copper indium selenide/sulfide, etc.) in various forms (e.g., crystalline, amorphous, microcrystalline, etc.), and be produced on one or more substrate, which may be a flexible (e.g., PVC) or a solid (e.g., glass, silicon, etc.) substrate. In some aspects, the size and position of the solar panel 560 relative to the WHC 520 may be such that it may not substantially block a top/side surface of the WHC 120 from the incident rays of the sun. The solar panel 560 may be detachable from the solar pool heater 502. The lighting source 560 may include a number of light sources (e.g., light emitting diode (LED) lights or other light sources). The light sources may be of different colors and may be powered and controlled by the electronic module 512 to produce different lighting patterns. For example each lighting pattern may be used with a specific water fountain pattern.

In some aspects, the electronic module 512 may include a chargeable battery that can be charged by the solar panel 510 and the related electronic circuit/circuits for such charging. The electronic module 512 may be operable to provide power for and control the pump, for example, turn the pump ON or OFF or control the speed or direction of rotation (e.g., forward or reverse) of the pump. The electronic module 512 may also be operable to control the lighting source 560, by turning a portion of or the entire lights on the lighting source 560 ON or OFF or perform other controls of the lighting source. The electronic module 512 may communicate with a remote control, for example, to control the lighting source 560, turn the pump ON or OFF, or change the direction of rotation of the pump. The electronic module 512 including the rechargeable battery may be housed in a water proof cover (e.g. a bag) 514 or otherwise be protected from the surrounding water (e.g., suitably sealed with a water proof material). The electronic module 512 may be electrically coupled to the solar panel 510 and the lighting source 560 via sealed (e.g., water sealed) couplings in a sealed manner. The pump may have a suitable size and power for filling or emptying the WHC 520 and be electrically coupled to the electronic module 512 via a sealed (e.g., water sealed) coupling in a sealed manner.

In some aspects, the lighting source 560 may also include speakers with appropriate size, which can play music or other audio generated by the electronic module 512. The audio/music may be in harmony with the light pattern and/or the water fountain pattern.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such "an embodiment" may refer to one or more embodiments and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

ILLUSTRATIONS OF SUBJECT DISCLOSURE USING CLAUSES

Various examples of aspects of the disclosure are described as numbered clauses (1, 2, 3, etc.) for convenience. These are provided as examples, and do not limit the subject technology. Identifications of the figures and reference numbers are provided below merely as examples and illustrative purposes, and the clauses are not limited by those identifications.

1. An apparatus (e.g., 100 of FIG. 1A, 200 of FIG. 2A or apparatuses shown in FIG. 4A-4C or FIG. 5A-5B) for solar heating of a pool comprising:
a floating member (e.g., 110 of FIG. 1A, 310 of FIG. 3A, 410 of FIGS. 4A-4C, and 510 of FIGS. 5A-5B);
a water heater chamber (WHC) (e.g., 120 of FIG. 1A, 320 of FIG. 3A, 420 of FIGS. 4A-4C, and 520 of FIG. 5A-5B); attached to the floating member, wherein the floating member is operable to make the WHC floatable;
one or more first tubes (e.g., 150 of FIG. 1A and 450 of FIGS. 4A-4C); penetrating the floatable WHC to allow water from the pool enter the floatable WHC; and
one or more exit ports (e.g., 124 of FIG. 1A, 424 of FIGS. 4A-4C, and FIG. 5A) operable to allow heated water from the floatable WHC to enter the pool, wherein the floatable WHC utilizes incident solar energy to heat up water.

2. The apparatus of clause 1, wherein the floating member is an inflatable member that can be filled with a gas, wherein the gas is air, and wherein the floating member is capable of keeping the floatable WHC, when containing water, floating over the pool.

3. The apparatus of clause 1, wherein the floating member is donut shaped, and wherein the floating member is capable of keeping the floatable WHC, when containing water, floating over the pool.

4. The apparatus of clause 1, wherein the floatable WHC is attached to the floating member at least one of permanently or via one or more detachable fasteners, and wherein the one or more first tubes penetrate the floatable WHC from a bottom surface of the floatable WHC.

5. The apparatus of clause 1, wherein an upper portion of the floatable WHC is substantially transparent to sun light to allow solar energy enter the floatable WHC and a bottom portion of the floatable WHC is substantially sun-light absorbent to facilitate absorption of the solar energy entering the floatable WHC, and wherein the floatable WHC is made at least partially of vinyl and the bottom portion of the floatable WHC is at least one of made of or coated with a sun-light absorbent material.

6. The apparatus of clause 5, wherein a side portion of the floatable WHC is at least one of made of or coated with a substantially reflective material to facilitate reflecting oblique incident rays of sun light onto the bottom portion of the floatable WHC.

7. The apparatus of clause 1, wherein the one or more exit ports are operable to allow heated water from a top portion of the floatable WHC to enter the pool, wherein at least some of the one or more exit ports include a valve, wherein the valve is at least one of temperature sensitive or pressure sensitive and is operable to allow the water from the floatable WHC to exit from the floatable WHC upon reaching a predetermined temperature or pressure, wherein water continues to flow into the floatable WHC from the pool due to convection current, and wherein each of the one or more first tubes includes a unidirectional valve that prevents water from escaping the floatable WHC through the first tube.

8. The apparatus of clause 1, wherein the one or more exit ports are at least one of:
operable to allow heated water from the floatable WHC to enter the pool through one or more second tubes, wherein the one or more second tubes are made at least partially of vinyl and are operable to facilitate transporting heated water from the floatable WHC to the pool without vaporizing and substantially maintaining transported water temperature; and
operable to couple to one or more water fountain nuzzles, such that the heated water return to the pool through the water fountain nuzzles.

9. The apparatus of clause 1, further comprising at least one of a solar panel, a water fountain nuzzle, a lighting source, and a pump, wherein the solar panel is attached to the floatable WHC and is configured to provide power to the pump and the lighting source, wherein the pump is coupled to one or more first tubes and is operable to facilitate transport of water from the pool to the floatable WHC, wherein the solar panel is attached to a top portion of the floatable WHC, and wherein the lighting source includes audio speakers.

10. The apparatus of clause 1, further comprising a perforated membrane attached inside the floatable WHC, wherein the perforated membrane is at least one of made of or coated on a top surface of the membrane with a sun light absorbing material, and wherein the perforated membrane allows water transport through perforations and facilitate converting solar energy to heat.

Figure 6:
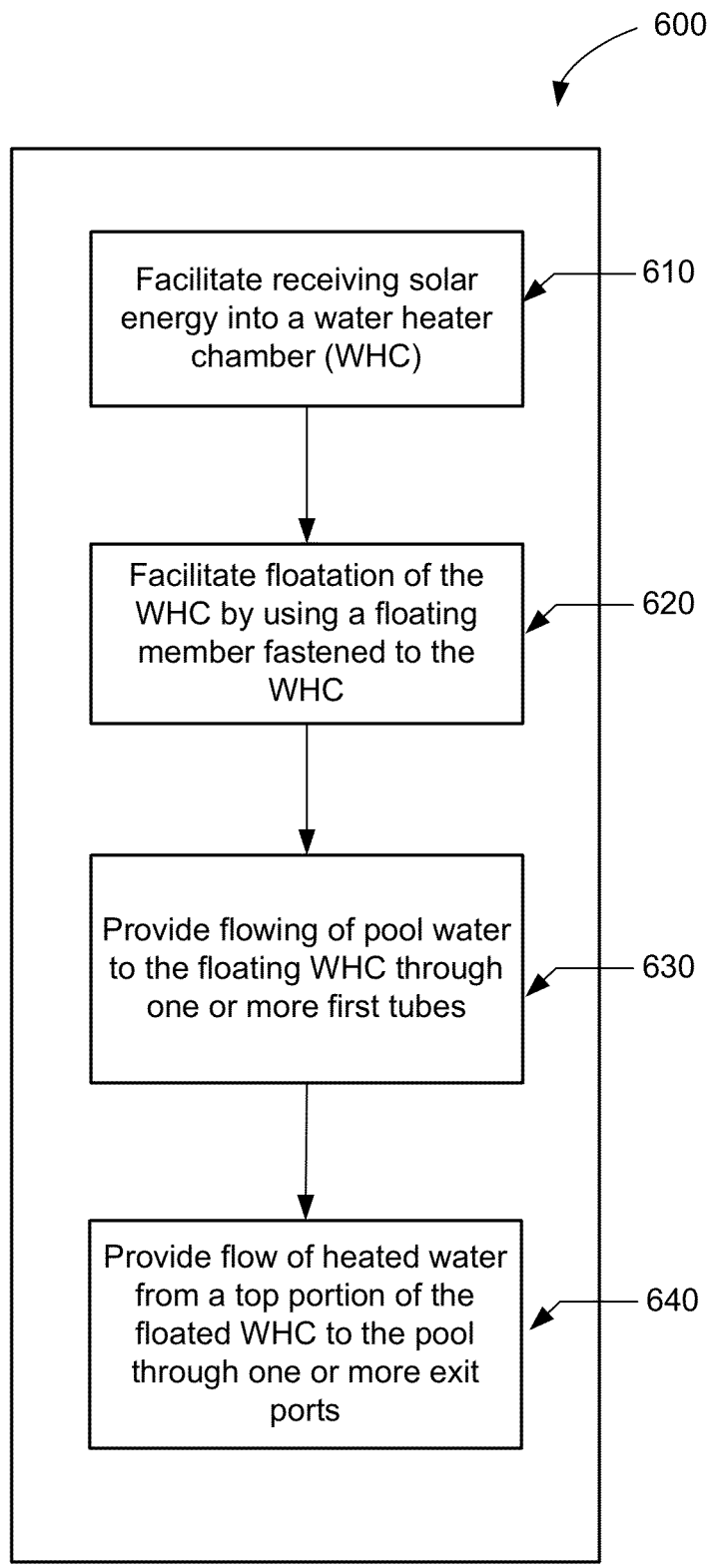
FIG. 6 is a flow diagram illustrating an example method for solar pool heating, in accordance with certain configurations of the present disclosure.

11. A method (e.g., 600 of FIG. 6) solar heating of a pool comprising:
facilitating receiving solar energy into a water heater chamber (WHC) (e.g., 610 of FIG. 6);
facilitating floatation of the WHC by using a floating member attached to the WHC (e.g., 620 of FIG. 6), wherein the floating member is operable to make the WHC floatable;
providing flowing of pool water to the floatable WHC through one or more first tubes penetrating into the floatable WHC (e.g., 630 of FIG. 6); and
providing flow of heated water from the floatable WHC to the pool through one or more exit ports (e.g., 640 of FIG. 6).

12. The method of clause 11, wherein facilitating floatation comprises using an inflatable floating member that can be filled with a gas, wherein the gas is air, and wherein the floating member facilitates keeping the floatable WHC, when containing water, floating over the pool.

13. The method of clause 11, wherein the floating member is donut shaped, and wherein the floating member facilitates keeping the floatable WHC, when containing water, floating over the pool.

14. The method of clause 11, wherein the floatable WHC is attached to the floating member at least one of permanently or via one or more detachable fasteners, and wherein the one or more first tubes penetrate the floatable WHC from a bottom surface of the floatable WHC.

15. The method of clause 11, wherein facilitating converting solar energy into heat comprises providing an upper portion of the floatable WHC substantially transparent to sun light to allow solar energy enter the floatable WHC and a bottom portion of the floatable WHC substantially sun-light absorbent to facilitate absorption of the solar energy entering the floatable WHC, and providing the floatable WHC made at least partially of vinyl and the bottom portion of the floatable WHC at least one of made of or coated with a sun-light absorbent material.

16. The method of clause 15, wherein facilitating converting solar energy into heat further comprises providing a side portion of the floatable WHC at least one of made of or coated from inside with a substantially reflective material that facilitates reflecting of oblique incident rays of sun light onto the sun-light absorbent bottom portion of the floatable WHC or is made of or coated from inside and/or outside with a sun-absorbent material.

17. The method of clause 11, wherein providing flow of heated water is from a top portion of the floatable WHC, wherein providing flow of heated water comprises providing at least some of the one or more exit ports including a valve, wherein the valve is at least one of temperature sensitive or pressure sensitive and allows the water from the floatable WHC to exit from the floatable WHC upon reaching a predetermined temperature or pressure, wherein providing flowing of pool water to the floatable WHC takes place through a convection current, and wherein each of the one or more first tubes includes a unidirectional valve that prevents water from escaping the floatable WHC through the first tube.

18. The method of clause 11, wherein providing flow of heated water comprises at least one of:
providing the one or more exit ports configured to allow heated water from the floatable WHC to enter the pool through one or more second tubes, wherein the one or more second tubes are made at least partially of vinyl and facilitate transporting heated water from the floatable WHC to the pool without vaporizing and substantially maintaining transported water temperature; and
providing one or more water fountain nuzzles attached to the one or more exit ports, such that the heated water return to the pool through the water fountain nuzzles.

19. The method of clause 11, further comprising providing at least one of a solar panel, a water fountain nuzzle, a lighting source, and a pump, wherein the solar panel is attached to the floatable WHC and is configured to provide power to the pump and the lighting source, wherein the pump is coupled to one or more first tubes and is operable to facilitate transport of water from the pool to the floatable WHC, wherein the solar panel is attached to a top portion of the floatable WHC, and wherein the lighting source includes audio speakers.

20. The method of clause 11, further comprising providing a perforated membrane attached inside the floatable WHC, wherein the perforated membrane is at least one of made of or coated on a top surface of the membrane with a sun light absorbing material, and wherein the perforated membrane allows water transport through perforations and facilitate converting solar energy to heat.

Figure 7:
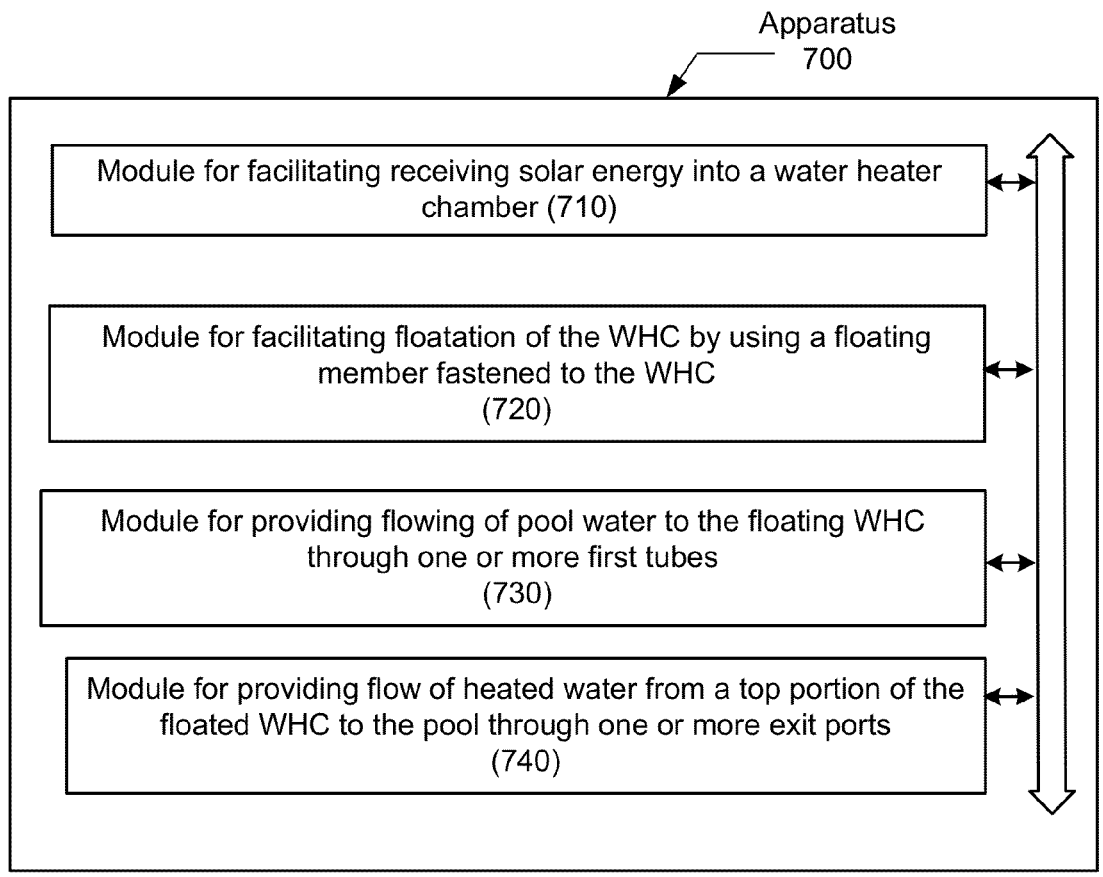
FIG. 7 is a block diagram illustrating an example apparatus for solar pool heating, in accordance with certain configurations of the present disclosure.

21. An apparatus (e.g., 700 of FIG. 7) for solar heating of a pool comprising:

means for facilitating receiving solar energy into a water heater chamber (WHC) (e.g., 710 of FIG. 7);

means for facilitating floatation of the WHC including a floating member attached to the WHC (e.g., 720 of FIG. 7), wherein the floating member is operable to make the WHC floatable;

means for providing flowing of pool water to the floatable WHC including one or more first tubes penetrating into the floatable WHC (e.g., 730 of FIG. 7); and means for providing flow of heated water from the floatable WHC to the pool through one or more exit ports (e.g., 740 of FIG. 7).

22. The apparatus of clause 21, wherein means for facilitating floatation comprises an inflatable floating member that can be filled with a gas, wherein the gas is air, and wherein the floating member facilitates keeping the floatable WHC, when containing water, floating over the pool.

23. The apparatus of clause 21, wherein the floating member is donut shaped, and wherein the floating member facilitates keeping the floatable WHC, when containing water, floating over the pool.

24. The apparatus of clause 21, wherein the floatable WHC is attached to the floating member at least one of permanently or via one or more detachable fasteners, and wherein the one or more first tubes penetrate the floatable WHC from a bottom surface of the floatable WHC.

25. The apparatus of clause 21, wherein means for facilitating converting solar energy into heat comprises means for providing an upper portion of the floatable WHC substantially transparent to sun light to allow solar energy enter the floatable WHC and a bottom portion of the floatable WHC substantially sun-light absorbent to facilitate absorption of the solar energy entering the floatable WHC, and providing the floatable WHC made at least partially of vinyl and the bottom portion of the floatable WHC at least one of made of or coated with a sun-light absorbent material.

26. The apparatus of clause 25, wherein means for facilitating converting solar energy into heat further comprises means for providing a side portion of the floatable WHC at least one of made of or coated from inside with a substantially reflective material that facilitates reflecting of oblique incident rays of sun light onto the sun-light absorbent bottom portion of the floatable WHC or is made of or coated from inside and/or outside with a sun-absorbent material.

27. The apparatus of clause 21, wherein means for providing flow of heated water provides flow of heated water from a top portion of floatable WHC, wherein means for providing flow of heated water comprises providing at least some of the one or more exit ports including a valve, wherein the valve is at least one of temperature sensitive or pressure sensitive and allows the water from the floatable WHC to exit from the floatable WHC upon reaching a predetermined temperature or pressure, wherein providing flowing of pool water to the floatable WHC takes place through a convection current, and wherein each of the one or more first tubes includes a unidirectional valve that prevents water from escaping the floatable WHC through the first tube.

28. The apparatus of clause 21, wherein means for providing flow of heated water comprises at least one of:

one or more exit ports configured to allow heated water from the floatable WHC to enter the pool through one or more second tubes, wherein the one or more second tubes are made at least partially of vinyl and facilitate transporting heated water from the floatable WHC to the pool without vaporizing and substantially maintaining transported water temperature; and one or more water fountain nuzzles attached to the one or more exit ports, such that the heated water return to the pool through the water fountain nuzzles.

29. The apparatus of clause 21, further comprising at least one of a solar panel, a water fountain nuzzle, a lighting source, and a pump, wherein the solar panel is attached to the floatable WHC and is configured to provide power to the pump and the lighting source, wherein the pump is coupled to one or more first tubes and is operable to facilitate transport of water from the pool to the floatable WHC, wherein the solar panel is attached to a top portion of the floatable WHC, and wherein the lighting source includes audio speakers.

30. The apparatus of clause 21, further comprising a perforated membrane attached inside the floatable WHC, wherein the perforated membrane is at least one of made of or coated on a top surface of the membrane with a sun light absorbing material, and wherein the perforated membrane allows water transport through perforations and facilitate converting solar energy to heat.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, a side surface and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While certain aspects and embodiments of the invention have been described, these have been presented by way of example only, and are not intended to limit the scope of the invention. Indeed, the novel methods and systems described herein may be embodied in a variety of other forms without departing from the spirit thereof. The accompanying claims and their equivalents are intended to cover such forms or modifications as would fall within the scope and spirit of the invention.

I claim:

1. An apparatus for solar heating of a pool comprising:
a floating member;
a water heater chamber (WHC) attached to the floating member, wherein the floating member is operable to make the WHC floatable;
one or more first tubes penetrating the floatable WHC, the one or more first tubes configured to allow water from the pool enter the floatable WHC; and
one or more exit ports operable to allow heated water from the floatable WHC to enter the pool,
wherein:
the floatable WHC is configured to utilize incident solar energy to heat up water,
at least some of the one or more exit ports include a valve, and
the valve is configured to be operable to allow the heated water from the floatable WHC to exit from the floatable WHC upon reaching one of a predetermined temperature or a predetermined pressure; further comprising at least one of a solar panel, a water fountain nuzzle, a lighting source, and a pump, wherein the solar panel is attached to the floatable WHC and is configured to provide power to the pump and the lighting source, wherein the pump is coupled to one or more first tubes and is operable to facilitate transport of water from the pool to the floatable WHC, wherein the solar panel is attached to a top portion of the floatable WHC, and wherein the lighting source includes audio speakers.

2. The apparatus of claim 1, wherein the floating member is an inflatable member is configured to be filled with a gas, wherein the gas comprises air, and wherein the floating member is capable of keeping the floatable WHC, when containing water, floating over the pool.

3. The apparatus of claim 1, wherein the floating member comprises a donut shaped member, and wherein the floating member is capable of keeping the floatable WHC, when containing water, floating over the pool.

4. The apparatus of claim 1, wherein the floatable WHC is attached to the floating member at least one of permanently or via one or more detachable fasteners, and wherein the one or more first tubes penetrate the floatable WHC from a bottom surface of the floatable WHC.

5. The apparatus of claim 1, wherein an upper portion of the floatable WHC is configured to be substantially transparent to sun light to allow solar energy enter the floatable WHC and a bottom portion of the floatable WHC is configured to be substantially sun-light absorbent to facilitate absorption of the solar energy entering the floatable WHC, and wherein the floatable WHC is made at least partially of vinyl and the bottom portion of the floatable WHC comprises at least one of made of or coated with a sun-light absorbent material.

6. The apparatus of claim 5, wherein a side portion of the floatable WHC comprises at least one of made of or coated with a substantially reflective material to facilitate reflecting oblique incident rays of sun light onto the bottom portion of the floatable WHC.

7. The apparatus of claim 1, wherein the one or more exit ports are operable to allow heated water from a top portion of the floatable WHC to enter the pool, wherein the valve comprises at least one of a temperature sensitive or a pressure sensitive valve, and wherein the apparatus is configured to allow continuous flow of water into the floatable WHC from the pool due to convection current.

8. The apparatus of claim 1, wherein the one or more exit ports are at least one of:
operable to allow heated water from the floatable WHC to enter the pool through one or more second tubes, wherein the one or more second tubes are made at least partially of vinyl and are operable to facilitate transporting heated water from the floatable WHC to the pool without vaporizing and substantially maintaining transported water temperature; and
operable to couple to one or more water fountain nuzzles to allow the heated water return to the pool through the water fountain nuzzles.

9. The apparatus of claim 1, further comprising a perforated membrane attached inside the floatable WHC, wherein the perforated membrane is at least one of made of or coated on a top surface of the membrane with a sun light absorbing material, and wherein the perforated membrane is configured to allow water transport through perforations and to facilitate converting solar energy to heat.

10. A method for solar heating of a pool comprising:
facilitating receiving solar energy into a water heater chamber (WHC);
facilitating floatation of the WHC by using a floating member attached to the WHC, wherein the floating member is operable to make the WHC floatable;
providing flowing of pool water to the floatable WHC through one or more first tubes penetrating into the floatable WHC; and
providing flow of heated water from the floatable WHC to the pool through one or more exit ports, wherein:
at least some of the one or more exit ports include a valve, and
the valve is configured to be operable to allow the heated water from the floatable WHC to exit from the floatable WHC upon reaching one of a predetermined temperature or a predetermined pressure; further comprising providing at least one of a solar panel, a water fountain nuzzle, a lighting source, and a pump, wherein the solar panel is attached to the floatable WHC and is configured to provide power to the pump and the lighting source, wherein the pump is coupled to one or more first tubes and is operable to facilitate transport of water from the pool to the floatable WHC, wherein the solar panel is attached to a top portion of the floatable WHC, and wherein the lighting source includes audio speakers.

11. The method of claim 10, wherein facilitating floatation comprises using an inflatable floating member that can be filled with a gas, wherein the gas comprises air, and wherein the floating member facilitates keeping the floatable WHC, when containing water, floating over the pool.

12. The method of claim 10, wherein the floating member comprises a donut shaped member, wherein the floating member facilitates keeping the floatable WHC, when containing water, floating over the pool, wherein the floatable WHC is attached to the floating member at least one of permanently or via one or more detachable fasteners, and wherein the one or more first tubes penetrate the floatable WHC from a bottom surface of the floatable WHC.

13. The method of claim 10, wherein facilitating converting solar energy into heat comprises providing an upper portion of the floatable WHC substantially transparent to sun light to allow solar energy enter the floatable WHC and a bottom portion of the floatable WHC substantially sun-light absorbent to facilitate absorption of the solar energy entering the floatable WHC, and providing the floatable WHC made at least partially of vinyl and the bottom portion of the floatable WHC at least one of made of or coated with a sun-light absorbent material.

14. The method of claim 13, wherein facilitating converting solar energy into heat further comprises providing a side portion of the floatable WHC at least one of made of or coated from inside with a substantially reflective material that facilitates reflecting of oblique incident rays of sun light onto the sun-light absorbent bottom portion of the floatable WHC or is made of or coated from inside and/or outside with a sun-absorbent material.

15. The method of claim 10, wherein providing flow of the heated water is from a top portion of floatable WHC, wherein the valve comprises at least one of a temperature sensitive or a pressure sensitive valve, and further comprising facilitating flowing of pool water to the floatable WHC through a convection current.

16. The method of claim 10, wherein providing flow of heated water comprises at least one of:
  providing the one or more exit ports configured to allow heated water from the floatable WHC to enter the pool through one or more second tubes, wherein the one or more second tubes are made at least partially of vinyl and facilitate transporting heated water from the floatable WHC to the pool without vaporizing and substantially maintaining transported water temperature; and
  providing one or more water fountain nuzzles attached to the one or more exit ports to allow the heated water return to the pool through the water fountain nuzzles.

17. The method of claim 10, further comprising providing a perforated membrane attached inside the floatable WHC, wherein the perforated membrane is at least one of made of or coated on a top surface of the membrane with a sun light absorbing material, and wherein the perforated membrane is configured to allow water transport through perforations and to facilitate converting solar energy to heat.

\* \* \* \* \*